United States Patent
Jain et al.

(10) Patent No.: US 9,215,552 B2
(45) Date of Patent: *Dec. 15, 2015

(54) MECHANISM TO PREVENT LOAD IN 3GPP NETWORK DUE TO MTC DEVICE TRIGGERS

(71) Applicant: Intel Corporation, Santa Clara, CA (US)

(72) Inventors: Puneet Jain, Hillsboro, OR (US); Meghashree Dattatri Kedalagudde, Hillsboro, OR (US); Muthaiah Venkatachalam, Beaverton, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/485,080

(22) Filed: Sep. 12, 2014

(65) Prior Publication Data

US 2015/0029845 A1  Jan. 29, 2015

Related U.S. Application Data

(63) Continuation of application No. 13/617,524, filed on Sep. 14, 2012, now Pat. No. 8,854,960.

(60) Provisional application No. 61/542,726, filed on Oct. 3, 2011.

(51) Int. Cl.
*H04W 4/00* (2009.01)
*H04W 28/02* (2009.01)
*H04W 88/16* (2009.01)

(52) U.S. Cl.
CPC .......... *H04W 4/005* (2013.01); *H04W 28/0289* (2013.01); *H04W 88/16* (2013.01); *H04W 28/0215* (2013.01); *H04W 28/0247* (2013.01)

(58) Field of Classification Search
None
See application file for complete search history.

(56) References Cited

U.S. PATENT DOCUMENTS

| | | | |
|---|---|---|---|
| 2012/0252518 A1* | 10/2012 | Karampatsis et al. | 455/515 |
| 2012/0257571 A1* | 10/2012 | Liao | 370/328 |
| 2013/0053087 A1* | 2/2013 | Li et al. | 455/518 |
| 2013/0078950 A1* | 3/2013 | Liao | 455/411 |
| 2013/0155948 A1* | 6/2013 | Pinheiro et al. | 370/328 |
| 2013/0308564 A1* | 11/2013 | Jain et al. | 370/329 |

* cited by examiner

*Primary Examiner* — Min Jung
(74) *Attorney, Agent, or Firm* — Kacvinsky Daisak Bluni PLLC

(57) ABSTRACT

Embodiments of methods and apparatus to manage MTC device trigger load in a wireless network are described herein. Other embodiments may be described and claimed.

25 Claims, 7 Drawing Sheets

MECHANISM TO PREVENT LOAD IN 3GPP NETWORK DUE TO MTC DEVICE TRIGGERS

CROSS-REFERENCE TO RELATED APPLICATIONS

The present application is a continuation of, claims the benefit of, and priority to earlier filed U.S. patent application Ser. No. 13/617,524, filed on Sep. 14, 2012, entitled "Mechanism to Prevent Load in 3GPP Network Due to MTC Device Triggers," which claims priority to U.S. provisional application 61/542,726 titled "Advanced Wireless Communication Systems and Techniques" filed Oct. 3, 2011, both of which are incorporated herein by reference in their entirety.

BACKGROUND ART

There is a need to provide communication services to fixed and mobile systems as efficient and inexpensively as possible. Machine-to-Machine (M2M) technologies can allow wireless and wired systems to communicate with other devices without human intervention. M2M communication can use a device such as a sensor or meter to collect data which may be relayed through a network (e.g., wireless, wired, or hybrid), as part of a trigger request or in response to a trigger request, to an application that translates the data into meaningful information.

Expansion of mobile networks across the world with accompanying increased speed/bandwidth and reduced power of wireless communication has facilitated growth of M2M communication. Although the amount of trigger requests, triggers, and data sent by M2M devices is very small, a large number of these devices, in combination, may increase load on a network. Current techniques for transmitting machine type communication (MTC) trigger requests, triggers, and data may be inefficient or cause a significant load on supporting equipment, or network elements, in the mobile network.

BRIEF DESCRIPTION OF THE DRAWING

Aspects, features and advantages of embodiments of the present invention will become apparent from the following description of the invention in reference to the appended drawings in which like numerals denote like elements and in which.

DETAILED DESCRIPTION OF THE INVENTION

Figure 1:
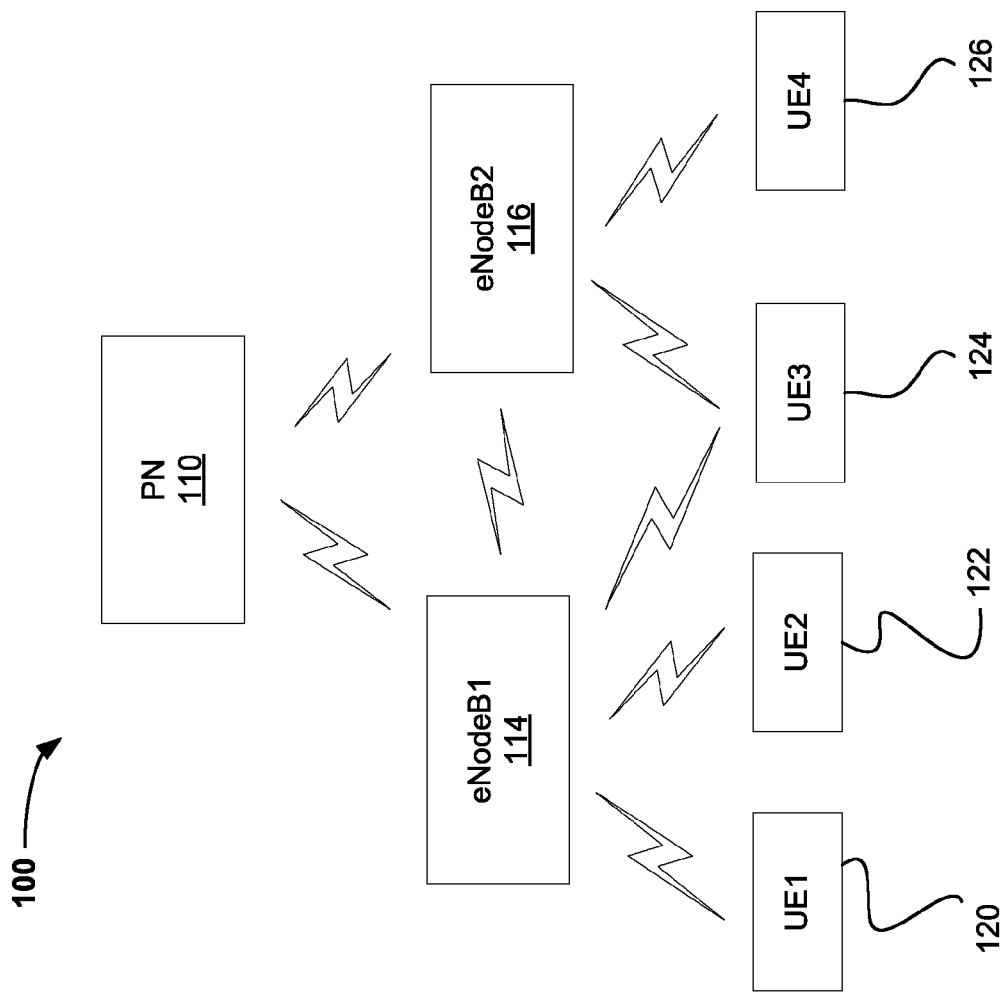
FIG. 1 is a block diagram of a mobile network according to various embodiments.

While the following detailed description describes example embodiments of the present invention in relation to broadband wireless wide area networks (WWANs), the invention is not limited thereto and can be applied to other types of wireless networks where similar advantages can be obtained. Such networks specifically include wireless local area networks (WLANs), wireless personal area networks (WPANs) and/or wireless metropolitan area networks (WMANs). Further, while specific embodiments may be described in reference to wireless networks utilizing orthogonal frequency division multiplexing (OFDM) or orthogonal frequency division multiple access (OFDMA), the embodiments of present invention are not limited thereto and, for example, can be implemented and/or combined with other air interfaces including single carrier communication channels including single-carrier frequency division multiple access (SC-FDMA) or other protocols and air interfaces for uplink (UL) and/or downlink (DL) communications where suitably applicable. Further, the embodiments described herein may be applied to heterogeneous networks where two or more wired and wireless networks may be combined to transfer signals, data, and messages.

The following inventive embodiments can be used in a variety of applications including transmitters and receivers of a radio system, although embodiments of the invention are not limited in this respect. Radio systems specifically included within the scope of the present invention include, but are not limited to, fixed or mobile devices, relays, gateways, bridges, hubs, routers, network interface cards (NICs), network adaptors, or other network devices. Further, the radio systems may be implemented in cellular radiotelephone systems, satellite systems, two-way radio systems as well as computing devices including such radio systems including personal computers (PCs), netbooks, ultrabooks, tablets, and related peripherals, personal digital assistants (PDAs), personal computing accessories, hand-held communication devices such as smartphones and all systems which may be related in nature and to which the principles of the inventive embodiments could be suitably applied. Further, each system can be arranged to operate using a number of radios over a plurality of networks wherein two or more networks overlap and co-exist, such as a WWAN, a WLAN, and/or a WPAN.

For the purposes of the detailed description, the phrase "A/B" means A or B. The phrase "A and/or B" means "(A), (B), or (A and B)." The phrase "at least one of A, B and C" means "(A), (B), (C), (A and B), (A and C), (B and C) or (A, B and C)." Also, the phrase "(A)B" means "(B) or (AB)," that is, A is an optional element.

An emerging communications technology being developed for networking applications is the concept of machine to machine communications, which is referred to as machine type communications (MTC) in a $3^{rd}$ Generation Partnership Project (3GPP) Long Term Evolution (LTE) and its evolution LTE-Advanced (LTE-A) public land mobile network (PLMN) or home PLMN (HPLMN). MTC can also be used in other communications networks and standards and are not so limited to 3GPP networks. A feature of the MTC concept is the ability for a machine to perform automatic data transmissions in a network wherein each data transmission can be initiated by a first machine, routed through a network, and delivered to one or more other machines so that the one or more other machines can take an action or otherwise respond to the first machine without or with limited human intervention. In another embodiment, a plurality of machines may initiate a data transmission to be routed through a network and delivered to one or more other machines. MTC applications can be used in a variety of fixed and mobile systems including healthcare, security systems, smart home technologies, vending systems, manufacturing systems, vehicular information systems, and smart grids for example.

A result of the implementation of such systems includes increased signaling and data traffic used to support communications on one end, such as sensors or other measurement systems, and devices such as computers, smartphones, and tablets on another end of the communications in one or both directions. In other embodiments, the device such as a computer, smartphone, or tablet may incorporate sensor(s) to provide data for MTC communications. The signaling and data traffic can lead to network congestion and overloading of one or more nodes in the network when many signals are being sent from a single device, or from a group of devices over a network.

In embodiments, end-to-end MTC communications between a user equipment (UE) used for MTC and an MTC application may use services provided by a 3GPP system, and optionally services provided by an MTC server. The 3GPP system provides transport and communication services including 3GPP bearer services, internet protocol multimedia services (IMS), and short messaging services (SMS) and other various services that can facilitate MTC.

Turning to FIG. 1, an example wireless communication network 100 for MTC according to various inventive embodiments may be any wireless system capable of facilitating wireless access between a core network or provider network (PN) (110), one or more node b and/or evolved node B (eNodeB) 114 and 116, and one or more user equipment (UE) 120-126 including mobile and/or fixed subscribers. In various embodiments, the eNodeB 114 and/or 116 may be a fixed station (e.g., a fixed node) or a mobile station/node. In alternate embodiments, relay nodes (not shown) may also be in communication with one or more of the UE 120-126 and a donor eNodeB, which may be eNodeB 114 or 116. Further, a number of the UE 120-126 may also be in communication with one or more other wireless communication networks 100 including different types of wireless networks through heterogeneous networking (not shown).

The wireless communication network 100 may be a wireless communication network such as those contemplated by a $3^{rd}$ Generation Partnership Project (3GPP) Long Term Evolution (LTE) mobile phone network and its evolution LTE-Advanced (LTE-A), an Institute for Electrical and Electronics Engineers (IEEE) 802.16 mobile broadband wireless access (BWA) network, an IEEE 802.11 WLAN, or other type of network to which the principles of the inventive embodiments could be suitably applied. As used herein, the term "LTE-A" refers to any past, present, or future LTE standard, including, but not limited to, the release 11 version.

Reference herein to a user equipment (UE) may be a platform such as a subscriber station (SS), station (STA), node, terminal, mobile station (MS), advanced mobile station (AMS), high throughput (HT) station (STA), or very HT STA (VHT STA), among others. The various forms of platform including the UE, terminal, SS, MS, HT STA, and VHT STA may be interchanged and reference to a particular platform does not preclude other platforms from being substituted in various embodiment(s). An eNodeB may be a base station (BS), advanced base station (ABS), access point (AP), node, or node B. Further, these terms may be conceptually interchanged, depending on which wireless protocol is being employed, so a reference to eNodeB herein may also be seen as a reference to a BS, ABS, or AP, in various embodiments.

Any of the UE 120-126 and/or the eNodeB 114 and/or 116 may include a plurality of antennas to implement a multiple-input-multiple-output (MIMO) transmission system, which may operate in a variety of MIMO modes, including single-user MIMO (SU-MIMO), multi-user MIMO (MU-MIMO), close loop MIMO, open loop MIMO or other variations of smart antenna processing. Also, each UE 120-126 and/or eNodeB 114 and/or 116 may be configured with a plurality of input antennas and a single output antenna (MISO) or a single input antenna and a plurality of output antennas (SIMO).

The UE 120-126 may provide some form of channel state information (CSI) feedback to one or more of the eNodeB 114 and/or 116 via one or more UL channels, and the eNodeB 114 and/or 116 may adjust one or more DL channels based on the received CSI feedback. The feedback accuracy of the CSI may affect the performance of the MIMO system. The CSI feedback may include information related to channel quality index (CQI), precoding matrix indicator (PMI), and rank indication (RI). PMI may reference, or otherwise uniquely identity a precoder within a codebook. The eNodeB 114 and/or 116 may adjust the DL channel based on the precoder referenced by the PMI.

The UL channels and the DL channels can be associated with one or more frequency bands, which may or may not be shared between the UL channels and the DL channels. In one embodiment, the UL channels are positioned in a first frequency band and the DL channels are positioned in a second frequency band in a frequency division duplex (FDD) configuration. In another embodiment, the UL channels and the DL channels are positioned in a common frequency band in a time division duplex (TDD) configuration. Further, each frequency band may or may not be a contiguous frequency band. Each frequency band may be further divided into one or more subbands, which may or may not be shared by the UL and DL channels. Each frequency subband, carrier, or subcarrier, one or more aggregated subbands, or the one or more frequency bands for the UL or DL channels (wideband) may be referred to as a frequency resource.

Figure 2:
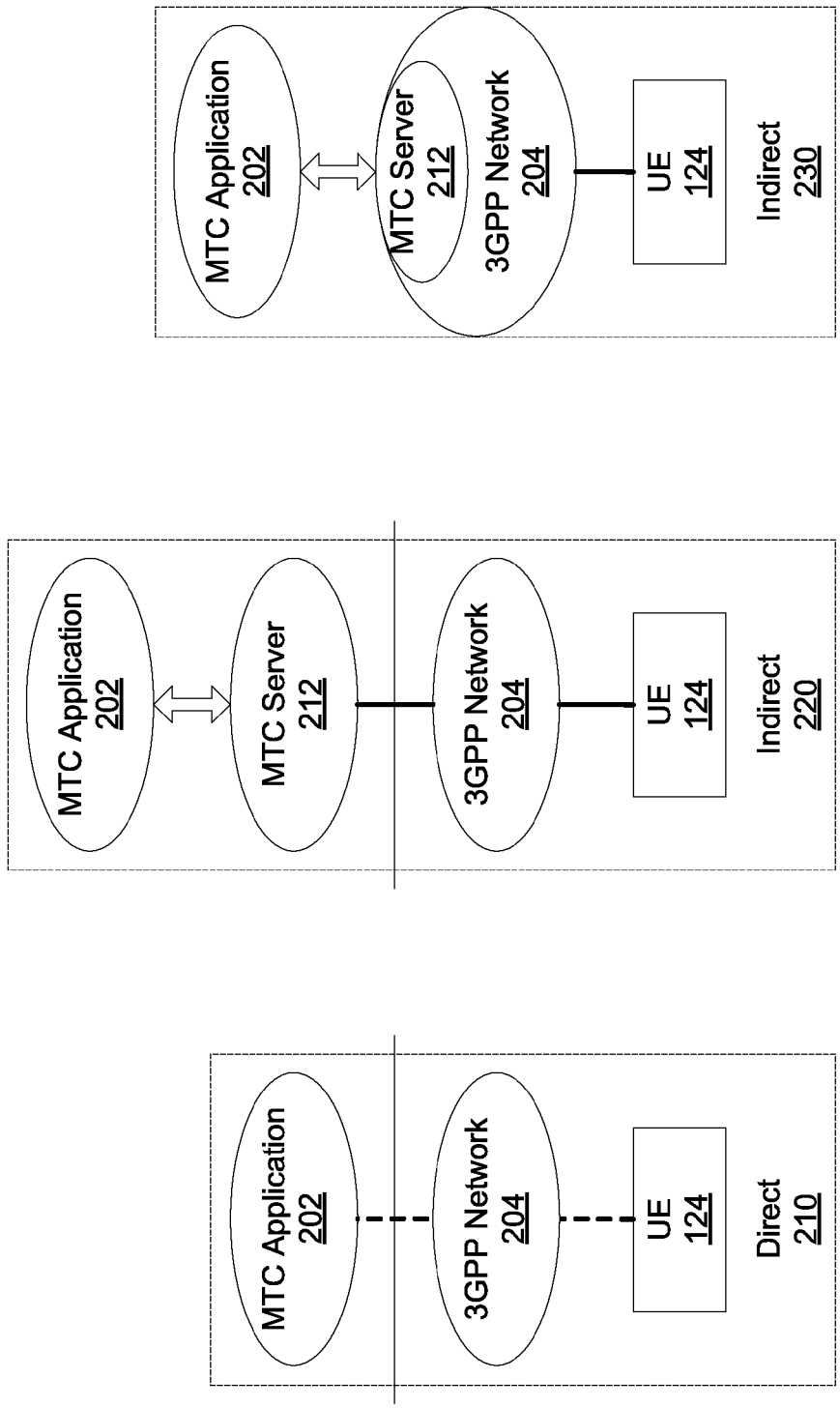
FIG. 2 is a block diagram of mobile networks according to various embodiments.

FIG. 2 is a block diagram of various embodiments of models for MTC between a MTC application and a mobile network or PLMN, such as the wireless communication network 100 of FIG. 1. A direct model 210 includes a MTC application 202 in direct communication with a UE 124 through a wireless network such as a 3GPP network 204, wherein communication between the MTC application 202 and the UE 124 is under operator control of the 3GPP network 204. Reference herein to UE 124 may be a reference to any of UEs 120, 122, 124, or 126 while a reference to eNodeB 114 may be a reference to either of eNodeB 114 or 116 of FIG. 1.

A first indirect model 220 and second indirect model 230 are also illustrated in FIG. 2 to provide embodiments where the MTC application 202 communicates with the UE 124 through MTC by making use of additional services provided by the 3GPP network 204. In the first indirect model 220, wherein communication may be controlled by a service provider, the MTC application 202 is adapted to make use of an MTC server 212, which can provide additional value added services provided by the service provider. An interface between the MTC server 212 and the MTC application 202 may be a wired and/or a wireless interface. The MTC server 212 communicates with the 3GPP network 204 by means of an interface or set of interfaces.

In the second indirect model 230, the MTC application may make use of the MTC server 212 for additional value added services provided by an operator of the 3GPP network 204. In the second indirect model 230, communication between the MTC server 212 and the 3GPP network 204 can be determined and provided internally within the mobile network or PLMN.

Figure 3:
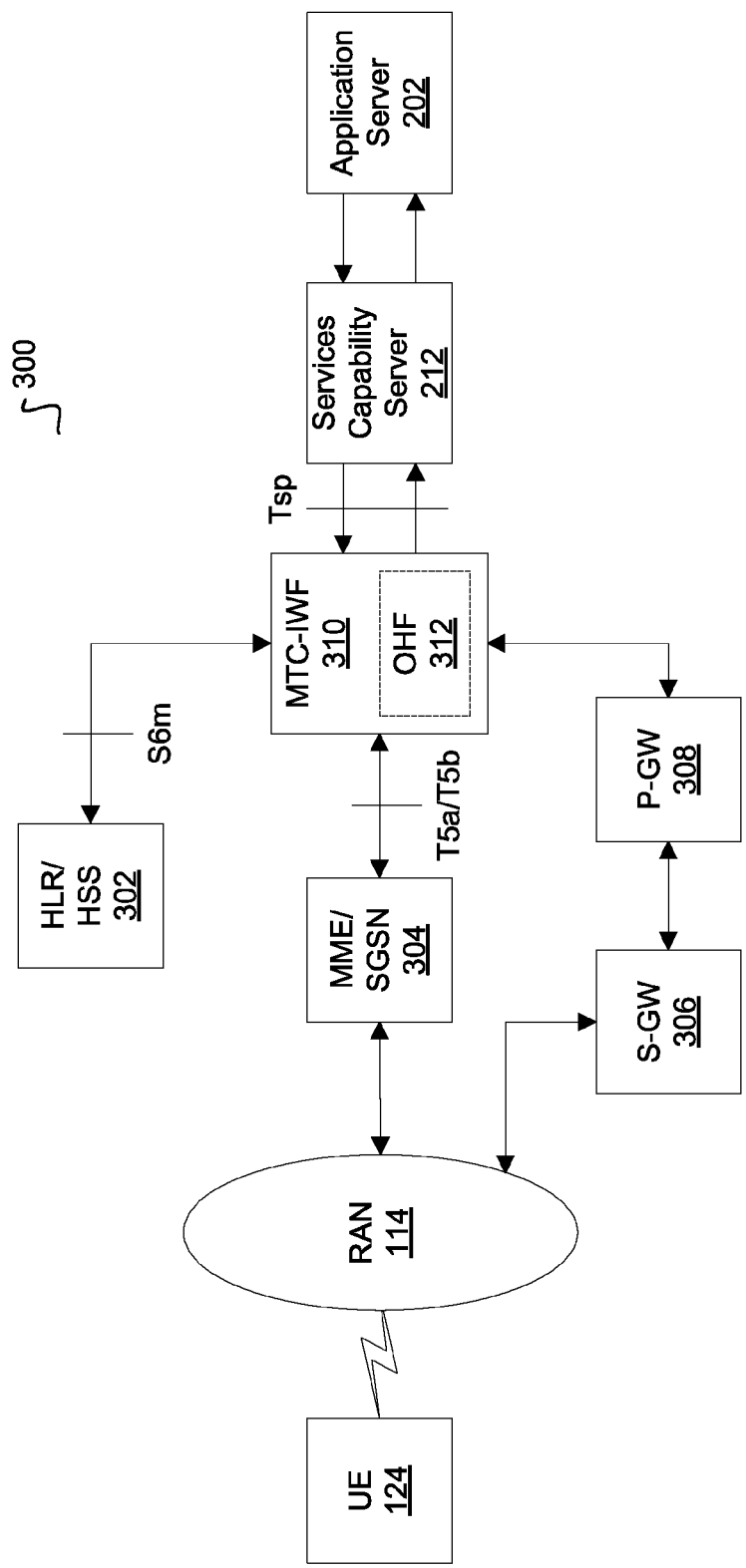
FIG. 3 is a block diagram of a machine type communications interworking function (MTC-IWF) in a mobile network according to various embodiments.

FIG. 3 illustrates network elements to provide a machine type communications interworking function (MTC-IWF) in a mobile network or PLMN, such as the wireless communication network 100 of FIG. 1. Network elements such as the eNodeB 114, UE 124, MTC application 202, MTC server 212, and MTC-IWF 310 are illustrated as single elements in the wireless communication network 100. However, it is understood by one skilled in the art that one or more of these network elements may be present in the wireless communication network 100 at any time. Further, additional network elements may be used in the wireless communication network 100 illustrated in FIG. 3.

MTC signals sent in the wireless communication network 100 include MTC signals based on or controlled by subscriber data while other MTC functions are based on indicators sent by the UE 124 to the wireless communication network 100. Network elements illustrated in the wireless communication network 100 of FIG. 3 may be used to provide a load control mechanism for trigger requests used in MTC communications. Trigger requests originating from one or more MTC applications 202 and communicated by the MTC server 212 to the MTC-IWF 310 can cause congestion and may overload one or more of the network elements, resulting in network latency. The MTC-IWF 310 may support indirect models 220 and/or 230 of FIG. 2 and alternate embodiments of the wireless communication network 100 including hybrid models wherein direct and indirect models are used at the same time, such as by connecting a user plane employing the direct model 210 and performing control plane signaling using an indirect model 220 and/or 230.

The MTC server 212 is interchangeably referred to as a Services Capability Server (SCS), or SCS 212. The MTC-IWF 310 may terminate a Tsp reference point or interface (hereinafter "reference point") between the MTC server 212 and the MTC-IWF 310. The MTC-IWF 310 may be configured to hide internal PLMN topology, and relay or translate signaling protocols used over the Tsp reference point to invoke specific functionality in the PLMN. In one embodiment, the MTC-IWF 310 may terminate a T5a/T5b reference point between a network element including a Mobility Management Entity (MME) and/or a Serving GPRS (General Packet Radio Service) Support Node (SGSN) such as, for example, MME/SGSN 304. In some embodiments, the T5a reference point may terminate on the SGSN of the MME/SGSN 304 and the T5b reference point may terminate on the MME of the MME/SGSN 304. In another embodiment, the MTC-IWF 310 may terminate an S6m reference point between a network element including a Home Location Register (HLR) and/or Home Subscriber Server (HSS) such as, for example, HLR/HSS 302. The T5a/T5b and S6m reference points are not limited to the example names provided and may be referred to by other names in other embodiments.

A system 300, such as an Evolved Packet System described in 3GPP, may support transmission of small data payloads with little network impact wherein the small data payload may be signaling overhead, network resources, and/or delay for reallocation as some examples. The UE 124 may be attached (e.g., by an established Radio Resource Control (RRC) connection) or detached from a radio access network (RAN) before transmission of the small data payload (e.g., when the small data payload transmission is triggered). The UE 124 may be in connected mode or idle mode when the small data payload transmission is triggered. In some embodiments, when the UE 124 is in idle mode, a system 300 may be configured to preferentially send the small data payload over the T5a/T5b reference point. The system 300 may be configured to send the small data payload over other reference points in other embodiments.

The T5a/T5b reference point may be used to send control packet information to a network (e.g., a 3GPP PLMN) based on an indication from the MTC server 212. The S6m reference point may be used to derive routing information for a downlink small data payload by obtaining a network identifier (e.g., 3GPP internal device identifier such as IMSI or Mobile Station International Subscriber Directory Number (MSISDN)) from an MTC device identifier or MTC application identifier.

One or more MTC-IWFs 310 can reside in a wireless communication network 100 such as a PLMN, particularly where multiple MTC-IWFs 310 are applied to provide alternate functionality in an event of an MTC-IWF 310 failure. In some embodiments, the MTC-IWF 310 may be a standalone network element or a functional entity of another network element, such as the MME/SGSN 304 or the HLR/HSS 302 of FIG. 3. In other embodiments, the MTC-IWF 310 is a network element outside of the system 300. The MTC-IWF 310 translates signaling protocols among other functions and invokes functionality within the wireless communication network 100. For example, the MTC-IWF 310 may authenticate the MTC server 212 before communication establishment with a 3GPP network.

The MTC-IWF 310 may authorize control plane requests from the MTC server 212 and may support control plane messaging from the MTC server 212, such as to receive a device trigger request to trigger a single device or multiple devices. The MTC-IWF 310 may also support control plane messaging to the MTC server 212 such as reporting device trigger request acknowledgement and device trigger success/failure delivery reports. The MTC-IWF 310 can select a most efficient and effective device trigger delivery mechanism based on reachability information of the UE 124. The MTC-IWF 310 can also select the device trigger delivery mechanism from device trigger delivery services supported by the wireless communication network 100 or a home PLMN or virtual PLMN, a device trigger delivery mechanism supported by the UE 124, any device trigger delivery policies, and any information received from the MTC server 212. The MTC-IWF 310 can also support secure communications between the 3GPP network 204 and the MTC server 212, among other functions.

The MTC-IWF 310 may also be configured with or adapted to include functionality to an overload handling function (OHF) 312. The OHF 312 may be a separate element from the MTC-IWF 310 in other embodiments, and may either be a stand-alone element or part of another network element such as the MME 304, the HLR/HSS 302, the P-GW 308, or the S-GW 306. Alternately, the OHF 312 could be spread across multiple network elements. For example, the OHF 312 may be a part of the MTC-IWF 310 and the MME 304, the OHF 312 may be a part of the MTC-IWF 310 and the HSS 302, or the OHF 312 may be a part of the MME 304 and the HSS 302 to feed information to the MTC-IWF 310. The MTC-IWF 310 can be coupled to the MTC server 212 directly or indirectly. For example, the MTC-IWF 310 and the MTC server 212 may communicate over an internet protocol (IP) layer used to connect servers, or the MTC-IWF 310 may be coupled to the MTC server 212 through an intermediate element such as a router or through cloud computing.

FIG. 3 also includes a home location register (HLR) and/or home subscriber server (HSS) element 302 to store and provide mapping/lookup of mobile subscriber integrated services digital network number (MSISDN) or external identifier(s) to international mobile subscriber identity (IMSI) and subscription information used by the MTC-IWF 310 for device triggering (e.g. serving MME/SGSN/MSC address) to the MTC-IWF 310. The HLR/HSS 302 may provide additional functionality in alternate embodiments. A mobility management entity (MME)/serving general packet radio service (GPRS) support node (SGSN) 304 is configured or adapted to receive a device trigger from the MTC-IWF 310, to encapsulate device trigger information in a non-access stratum (NAS) message sent to the UE 124 used for MTC, to receive a device trigger acknowledgement from a triggering UE 124, to report device trigger delivery success/failure status to the MTC-IWF 310, and can provide congestion and load information to the MTC-IWF 310, among other functionality in alternate embodiments. The serving gateway (S-GW) 306 can serve as a mobility anchor for mobility in the mobile network along with packet routing/forwarding among other functionality. The packet data network (PDN) gateway (P-GW) 308 can provide UE IP address allocation, per-user packet filtering, and lawful intercept functionality, though the embodiment is not so limited.

A load control mechanism for trigger requests can be scalably applied, as illustrated and described in various embodiments of the invention, to control an ingress rate of triggers from an MTC server 212 at the MTC-IWF 310 or an aggregate ingress rate from all MTC servers 212 in the wireless communication network 100 or PLMN, or by some other means to reduce load on the mobile network. NAS level congestion control provides that the wireless communication network 100 will not trigger a UE 124 as long as a particular congestion situation remains. The trigger load mechanisms can ensure that network congestion is not exacerbated by one or more UEs 124 that respond to triggers.

The OHF 312 of FIG. 3 may be adapted to provide load control for trigger requests received by the MTC-IWF 310. Various thresholds can be applied to gauge a level of overload determined by the OHF 312. In one embodiment, a threshold level can vary from threshold 1 to threshold n with one or more threshold levels situated between threshold 1 and threshold n (where n is a number, such as an integer), wherein threshold 1 denotes no overload and threshold n denotes a maximum overload. In an alternate embodiment, threshold 1 can denote maximum overload and threshold n can denote no threshold. The OHF 312 may be adapted to send messages to one or more network elements to indicate overload at the MTC-IWF 310 and/or the functionality provided by the OHF 312.

The MTC server 212 may be configured or adapted to send a device trigger request to the MTC-IWF 310. With each device trigger request, the MTC server 212 can embed a priority of the device trigger as one parameter associated with each device trigger request. The priority of the device trigger request could be assigned a value ranging from priority 1 through priority n, wherein priority 1 is low priority and priority n is a high priority with one or more levels of priority assigned between 1 and n. Alternately, priority 1 could be a high priority and priority n can be a low priority in another embodiment. Use of the values 1 through n is arbitrary in these embodiments and may instead range between zero and some other number, which may be an integer.

Based on an overload condition, the OHF 312 can set different threshold levels and as the overload increases, the OHF 312 can assign a higher level of threshold towards a maximum threshold level. In an alternate embodiment, the OHF 312 may be adapted to accept and apply a threshold value from another network element, such as the HLR/HSS 302 or the MME/SGSN 304. The MTC-IWF 310 and/or OHF 312 can check a priority associated with each device trigger request message from the MTC server 212 and if the threshold level indicates a lower level of overload, the MTC-IWF 310 and/or OHF 312 can reject lower priority device trigger requests but still process higher priority device trigger requests. As the threshold level continues to increase, the MTC-IWF 310 and/or OHF 312 can reject higher priority device trigger requests as well. In an embodiment where the threshold level reaches a maximum, the MTC-IWF 310 and/or OHF 312 can reject all device trigger request messages from the MTC server 212. The MTC-IWF 310 and/or OHF 312 may also send a cause value in a trigger reject message or trigger report message back to the MTC server 212, indicating that the device trigger request was not processed due to an overload condition, for example because subscriber information was not available from a network element such as the HLR/HSS 302, some other cause, or combination of causes.

The MTC-IWF 310 may first determine a validity of a device trigger request before sending a rejection to the MTC server 212. In alternate embodiments, the MTC-IWF 310 may reject the device trigger request without checking validity of the device trigger request. The MTC-IWF 310 may reject the device trigger request, for example, when the MTC-IWF 310 and/or OHF 312 reaches a high enough threshold or maximum threshold value. A timer such as a back-off timer can be applied to the MTC-IWF 310 and/or OHF 312 or applied to a UE 124. An event(s) may starts the back-off timer. As an example, reception of one or more device trigger request(s) can initiate the back-off timer, while reception of a subsequent device trigger request can re-initiate the back-off timer. A trigger request may be rejected if a back-off timer has been applied, wherein the back-off timer may be applied at the MTC-IWF 310, OHF 312, the UE 124, or another network element in the system 300. A threshold value can be decremented if no trigger is received when the back-off timer expires. In embodiments, the MTC-IWF 310 and/or OHF 312 can reference a back-off timer as part of a device trigger request reject message in a report to the MTC server 212. In response, the MTC server 212 may be adapted to hesitate, back-off, or stop sending a new trigger message to the MTC-IWF 310 and/or OHF 312 for a period of time.

Further, one or more network elements in the wireless communications network 100 such as the HLR/HSS 302, the MME/SGSN 304, and/or P-GW 308 can send unsolicited overload start message to the MTC-IWF 310 and/or OHF 312 indicating an overload condition at the network element, and that the MTC-IWF 310 should not generate any traffic toward one or more of those network elements. In response, the MTC-IWF 310 upon receiving the overload start message from the network element can increase its own threshold value. Each overload start and stop message may be discreet message(s) for purposes of communicating overload messaging. Alternately, the overload start and stop messages may be incorporated in one or more other messages. A decrease in an overload condition from the appropriate network element is indicated to the MTC-IWF 310 through an overload stop message and the OHF 312 can reduce the threshold level. The OHF 312 can again begin processing device trigger messages from the MTC server 212 as a function of priority based on a level of threshold.

Figure 4:
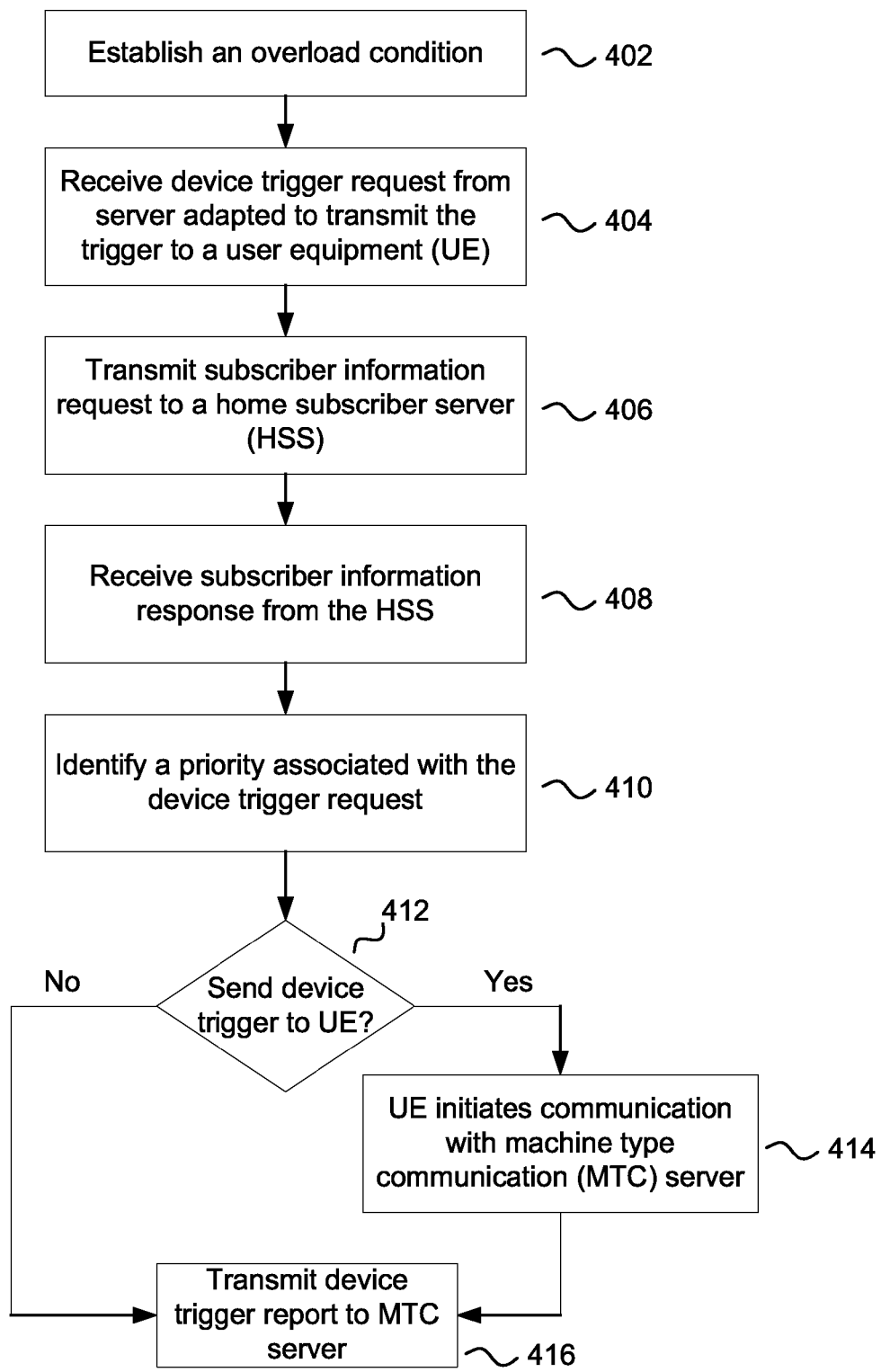
FIG. 4 is a diagram of machine type communications according to various embodiments.

FIG. 4 is a diagram showing an example of MTC according to various embodiments including a method to evaluate device trigger requests in a wireless communication network 100, such as a mobile network with system 300. Load control of signals received by a MTC-IWF 310 is initiated in element 402 to avoid signaling overload from a MTC server 212. A device trigger request is received from the MTC server 212 in element 404, wherein the MTC server 212 is adapted to transmit the device trigger request to trigger a UE 124, and wherein the device trigger may be adapted to prompt the UE 124 to initiate communication with the MTC server 212. The device trigger request may be further adapted to comprise a priority message. A subscriber information request is transmitted to an HSS 302 in element 406 and a subscriber information response is received from the HSS 302 in element 408. A priority associated with the device trigger request is identified in element 410 and determined whether the MTC server 212 is authorized to send a device trigger to the UE 124. Also, it is determined whether to send the device trigger to the UE 124 in element 412 and if not, a device trigger report is transmitted to the MTC server 212. If a device trigger is sent to the UE 124, then the UE 124 receives a device trigger and the UE 124 is prompted to initiate communication with the MTC server 212.

A cause value may be included with the device trigger report transmitted to the MTC server 212. The MTC server 212 is interchangeably referred to as a Services Capability Server (SCS), or SCS 212. A cause value may be an information element used to indicate success and/or failure of a trigger notification in some embodiments. Further, the cause value may indicate whether or not the device trigger was not transmitted to the UE 124. Load control of signals received by the MTC-IWF 310 can be initiated or otherwise employed based on receiving the device trigger request. A timer can be initiated after receiving the device trigger request. A second device trigger request may be received before the timer expires, which may prompt rejection of the second device trigger request. The embodiments described in FIG. 4 or otherwise described herein including FIG. 5 and FIG. 6 can be performed in compliance with $3^{rd}$ Generation Partnership Project (3GPP) Release 11 Long Term Evolution Advanced (LTE-A) or later evolutions thereof.

Figure 5:
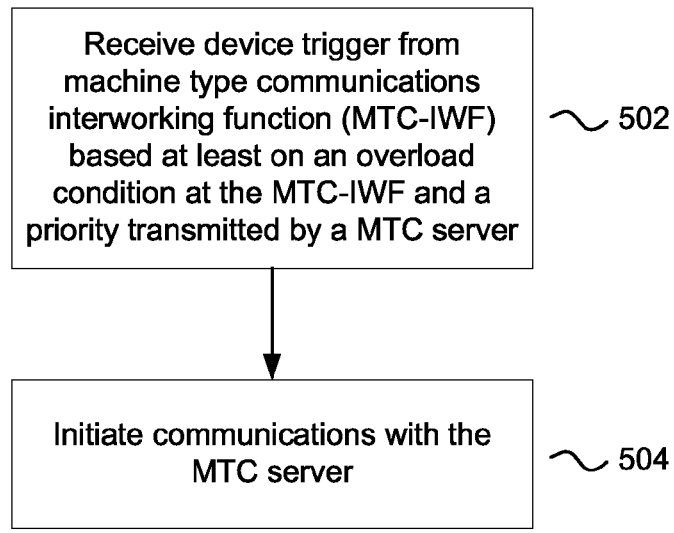
FIG. 5 is a diagram of machine type communications according to various embodiments.

FIG. 5 is a diagram illustrating MTC between the UE 124 and the MTC server 212 according to various embodiments. In element 502, MTC in a wireless communication network 100 such as a mobile network with system 300 comprises receiving, by the UE 124, a device trigger to trigger the UE 124 to initiate communication with the MTC server 212, wherein the MTC server 212 is adapted to transmit a subscriber information request to a HSS 302 and to receive a subscriber information response from the HSS 302 to indicate if the MTC server 212 is authorized to transmit the device trigger to the UE 124, and wherein the MTC server 212 transmits a device trigger request and a priority associated with the device trigger request to a MTC-IWF 310 for the MTC-IWF 310 to determine whether to send a device trigger report comprising a cause value to the MTC server 212. The device trigger is received to trigger the UE 124 to take an action, such as to initiate communication with a MTC application 202 associated with the MTC server 212. Further, a timer can be activated to control a load of device triggers in the wireless communication network 100.

Figure 6:
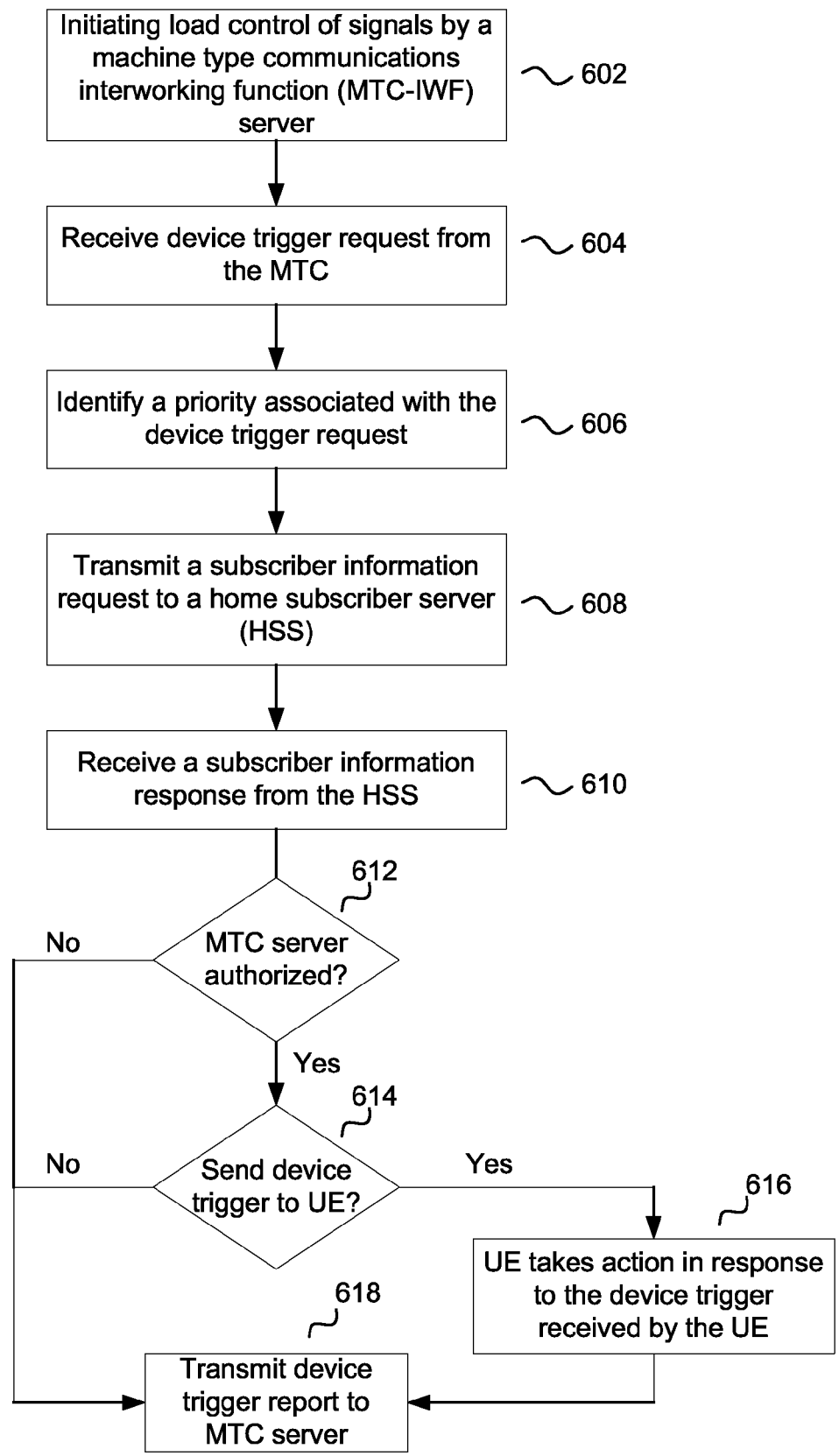
FIG. 6 is a diagram of machine type communications according to various embodiments.

FIG. 6 describes a method to evaluate device trigger requests in a wireless communication network 100 such as a mobile network with system 300, comprising initiating load control of signals in element 602 received by a MTC-IWF 310 to avoid signaling overload from an MTC server 212. In element 604, a device trigger request is received from the MTC server 212, wherein the MTC server 212 is adapted to transmit the device trigger request to trigger a UE 124 to initiate communication with the MTC server 212, the device trigger request comprising a priority message. A priority associated with the device trigger request is identified or otherwise determined in element 606 and a subscriber information request is sent to a HSS 302 in element 608. A subscriber information response is received from the HSS 302 in element 610 and determined whether the MTC server 212 is authorized to send a device trigger to the UE 124 in element 612. If the MTC server 212 is not authorized to send the device trigger to the UE 124, then a device trigger report is transmitted to the MTC server 212. If the MTC server 212 is authorized to send a device trigger to the UE 124, then it is determined whether to send the device trigger to the UE 124 in element 614. If it is determined to not send the device trigger to the UE 124, then a device trigger report is transmitted to the MTC server 212. If it is determined to send the device trigger to the UE 124, then the device trigger is sent to the UE 124 to prompt the UE to take an action in element 616. In element 618, a device trigger report is transmitted to the MTC server 212.

A cause value may be transmitted with the device trigger report to the MTC server 212. In some embodiments, the cause value may indicate that the device trigger was not transmitted to the UE 124. Further, load control of signals received by the MTC-IWF 310 can be adjusted based on receiving the device trigger request. Further, a timer or back-off timer, located at a network element or the UE 124 may commence after receiving the device trigger request and a second device trigger request may be received before the timer expires. The second device trigger may be rejected or accepted depending on the status of the timer. In an embodiment, the timer may be re-started based on reception of the second device trigger.

Figure 7:
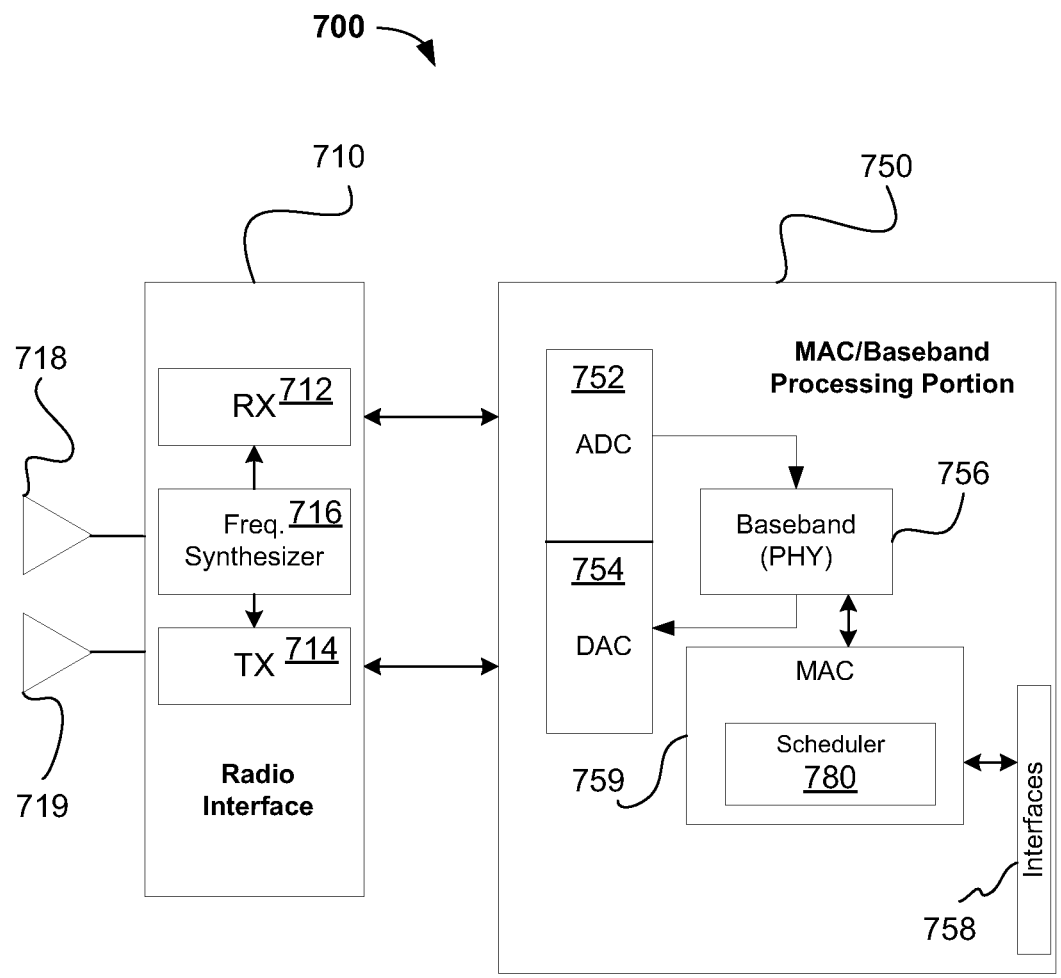
FIG. 7 is a block diagram of a wireless system arranged to communicate in a wireless network.

Referring to FIG. 7, an apparatus 700 for use in a wireless communication network 100 may include a medium access controller (MAC)/baseband processor portion 750 including logic (e.g., circuitry, processor, and software, or combination thereof) to perform functions as described in one or more of the processes herein. In other non-limiting embodiments, apparatus 700 may generally include a radio frequency (RF) interface 710 combined with the medium access controller (MAC)/baseband processor portion 750. Elements of FIG. 7 can be arranged to provide means to implement the operations and methods described herein.

In one example embodiment, RF interface 710 may be any component or combination of components arranged to send and receive multi-carrier modulated signals although the inventive embodiments are not limited to any specific over-the-air (OTA) interface or modulation scheme. RF interface 710 may include, for example, a receiver 712, a transmitter 714 and a frequency synthesizer 716. Interface 710 may also include bias controls, a crystal oscillator and/or one or more antennas 718, 719 if desired. Furthermore, RF interface 710 may alternatively or additionally use external voltage-controlled oscillators (VCOs), surface acoustic wave filters, intermediate frequency (IF) filters and/or radio frequency (RF) filters as desired. Various RF interface designs and their operation are known in the art and an expansive description thereof is therefore omitted.

Processing portion 750 may communicate with RF interface 710 to process receive/transmit signals and may include, by way of example only, an analog-to-digital converter 752 for down-converting received signals, a digital-to-analog converter 754 for up-converting signals for transmission, and if desired, a baseband processor 756 for physical (PHY) link layer processing of respective receive/transmit signals. Processing portion 750 may also include or be comprised of a processing circuit 759 for medium access control (MAC)/data link layer processing.

In certain embodiments, MAC processing circuit 759 may include a scheduler 780, in combination with additional circuitry such as a buffer memory (not shown) and baseband circuit 756, may function to perform the methods previously described. Alternatively or in addition, baseband processing circuit 756 may perform these processes independent of MAC processing circuit 759. MAC and PHY processing may also be integrated into a single circuit if desired. Further, the processing portion 750 may also be coupled to a man-machine interface 758 such as a touch screen, touch pad, keyboard, display, and/or other device to allow instructions to be provided by and/or communicated to a user. The processing portion 750 may also comprise additional interfaces 758 for wired connections such as Ethernet or other communications connections. Only one interface is shown for clarity, though multiple interfaces 758 for wired or wireless communication may be present to support functions, such as heterogeneous networking over multiple wireless protocols.

Apparatus 700 may be, for example, a base station, an access point, an eNodeB, a hybrid coordinator, a wireless router or alternatively a fixed or mobile user station such as a UE 124, platform or terminal, including a or NIC and/or network adaptor for computing devices. Accordingly, the previously described functions and/or specific configurations of apparatus 700 could be included or omitted as suitably desired.

Embodiments of apparatus 700 may also be implemented using single input single output (SISO), MISO, or the SIMO architectures as described herein. However, as shown in FIG. 7, certain preferred implementations may include multiple antennas (e.g., 718, 719) for transmission and/or reception using spatial multiplexing, spatial division multiple access (SDMA), beamforming and/or multiple input multiple output (MIMO) communication techniques. Further, embodiments of the invention may utilize multi-carrier code division multiplexing (MC-CDMA) multi-carrier direct sequence code division multiplexing (MC-DS-CDMA) or single carrier modulation techniques for OTA link access or any other modulation or multiplexing scheme compatible with the features of the inventive embodiments.

The following clauses pertain to further embodiments. A method for MTC in a mobile network may comprise receiving, by a UE 124, a device trigger to prompt the UE 124 to initiate communication with a MTC server 212 using a MME 304 and/or a MTC-IWF 310, wherein the MTC server 212 is adapted to transmit a device trigger request for the device trigger and a priority associated with the device trigger request to the MTC-IWF 310, and wherein the MTC-IWF 310 is adapted to transmit a subscriber information request to a HSS 302 and receive a subscriber information response from the HSS 302 to indicate if the MTC server 212 is authorized to request a device trigger for the UE 124. The method may further comprise receiving the device trigger to prompt the UE 124 to initiate communication with a MTC application 202 associated with the MTC server 212. Also, one or more MTC-IWFs 310 may reside in the mobile network and the mobile network may further comprise functionality referred to as an overload handling function (OHF) 312, wherein the OHF 312 is adapted to determine whether to send a device trigger report to the MTC server 212. Further, the OHF 312 may be a scalable load control mechanism associated with the MTC-IWF 310. The method may further comprise activating a timer to control a load of device triggers in the mobile network.

The components and features of apparatus 700 may be implemented using any combination of discrete circuitry, application specific integrated circuits (ASICs), logic gates and/or single chip architectures. Further, the features of apparatus 700 may be implemented using microcontrollers, digital signal processor (DSP)s, programmable logic arrays and/or microprocessors or any combination of the foregoing where suitably appropriate. It is noted that hardware, firmware and/or software elements described in embodiments of the invention may be collectively or individually referred to as "logic" or "circuit".

It should be appreciated that the example apparatus 700 shown in the block diagram of FIG. 7 represents only one functionally descriptive example of many potential implementations that may be combined with memory device(s), processor(s), an interface such as a display and/or touch-screen, a keyboard, and/or communication port(s). Accordingly, division, omission or inclusion of block functions depicted in the accompanying figures does not infer that the hardware components, circuits, software and/or elements for implementing these functions would be necessarily be divided, omitted, or included in embodiments of the present invention.

Unless contrary to physical possibility, the inventors envision the methods described herein: (i) may be performed in any sequence and/or in any combination; and (ii) the components of respective embodiments may be combined in any manner.

Embodiments of the invention may include sets of instructions executed on some form of processing core or cores or otherwise implemented or realized upon or within a machine-readable medium. A machine-readable medium includes any mechanism for storing or transmitting information in a tangible form readable by a machine (e.g., a computer). For example, one or more non-transitory machine-readable medium can include a tangible article of manufacture such as a read only memory (ROM); a random access memory (RAM); a magnetic disk storage media; an optical storage media; and a flash memory device, etc. In addition, a machine-readable medium may include propagated signals such as electrical, optical, acoustical or other form of propagated signals (e.g., carrier waves, infrared signals, digital signals, etc.).

Although there have been described example embodiments of this novel invention, many variations and modifications are possible without departing from the scope of the invention. Accordingly the inventive embodiments are not limited by the specific disclosure above, but rather only by the scope of the appended claims and their legal equivalents.

The invention claimed is:

1. At least one non-transitory computer-readable storage medium comprising a set of instructions that, in response to being executed at a machine-type communication interworking function (MTC-IWF) node, cause the MTC-IWF node to:
    identify a device trigger request comprising a request of a services capability server (SCS) for a device trigger to be sent to user equipment (UE), the MTC-IWF node to terminate a Tsp interface between the MTC-IWF node and the SCS;
    apply an MTC-IWF load control mechanism in response to the device trigger request;
    determine whether to accept the device trigger request; and
    send a message to report whether the device trigger has been accepted.

2. The at least one non-transitory computer-readable storage medium of claim 1, comprising instructions that, in response to being executed at the MTC-IWF node, cause the MTC-IWF node to reject the device trigger request in response to a determination that an overload condition exists, the sent message to comprise a value to indicate the existence of the overload condition.

3. The least one non-transitory computer-readable storage medium of claim 1, the device trigger request to contain a value to indicate a priority of the device trigger.

4. The least one non-transitory computer-readable storage medium of claim 1, comprising instructions that, in response to being executed at the MTC-IWF node, cause the MTC-IWF node to:
send a subscriber information request to retrieve subscription information associated with the device trigger request;
identify a subscriber information response in response to the subscriber information request; and
determine, based on the subscriber information response, whether the SCS is authorized to request device triggering of the UE.

5. The least one non-transitory computer-readable storage medium of claim 4, comprising instructions that, in response to being executed at the MTC-IWF node, cause the MTC-IWF node to determine not to accept the device trigger request in response to a determination that the SCS is not authorized to request device triggering of the UE.

6. The least one non-transitory computer-readable storage medium of claim 1, comprising instructions that, in response to being executed at the MTC-IWF node, cause the MTC-IWF node to:
initiate delivery of the device trigger in response to a determination to accept the device trigger request; and
send a message to report a delivery status of the device trigger.

7. A node comprising a machine-type communication interworking function (MTC-IWF) element, the node comprising:
logic, at least a portion of which is in hardware, the logic to identify a device trigger request comprising a request of a services capability server (SCS) to trigger user equipment (UE), send a subscriber information request to authorize the SCS to request triggering of the UE, identify a subscriber information response in response to the subscriber information request, and determine whether to accept the device trigger request based on the subscriber information response, the MTC-IWF element to terminate a Tsp interface between the MTC-IWF element and the SCS.

8. The node of claim 7, the subscriber information response to contain subscription information associated with the device trigger request.

9. The node of claim 7, the logic to determine to accept the device trigger request based at least in part on a determination that the subscriber information response indicates that the SCS is authorized to request triggering of the UE.

10. The node of claim 7, the logic to apply an MTC-IWF load control mechanism in response to receipt of the device trigger request.

11. The node of claim 10, the logic to determine to reject the device trigger request in response to a determination that an overload condition exists at the node.

12. The node of claim 7, the device trigger request to comprise a parameter specifying a priority associated with the device trigger request.

13. The node of claim 7, comprising one or more memory devices.

14. A node comprising a machine-type communication interworking function (MTC-IWF) element, the node comprising:
logic, at least a portion of which is in hardware, the logic to identify a device trigger request comprising a request of a services capability server (SCS) for a device trigger to be sent to user equipment (UE), the device trigger request to comprise a value to indicate a priority of the device trigger, the logic to apply an MTC-IWF load control mechanism in response to the device trigger request, determine whether to accept the device trigger request, and send a message to report whether the device trigger has been accepted, the MTC-IWF element to terminate a Tsp interface between the MTC-IWF element and the SCS.

15. The node of claim 14, the logic to reject the device trigger request in response to a determination that an overload condition exists.

16. The node of claim 15, the sent message to comprise a value to indicate the existence of the overload condition.

17. The node of claim 14, the logic to send a subscriber information request to retrieve subscription information associated with the device trigger request and identify a subscriber information response in response to the subscriber information request.

18. The node of claim 17, the logic to determine, based on the subscriber information response, whether the SCS is authorized to request device triggering of the UE.

19. The node of claim 18, the logic to determine not to accept the device trigger request in response to a determination that the SCS is not authorized to request device triggering of the UE.

20. At least one non-transitory computer-readable storage medium comprising a set of instructions that, in response to being executed at a machine-type communication interworking function (MTC-IWF) node, cause the MTC-IWF node to:
identify a device trigger request comprising a request of a services capability server (SCS) to trigger user equipment (UE), the device trigger request to comprise a parameter specifying a priority associated with the device trigger request, the MTC-IWF node to terminate a Tsp interface between the MTC-IWF node and the SCS;
send a subscriber information request to authorize the SCS to request triggering of the UE;
identify a subscriber information response in response to the subscriber information request;
and determine whether to accept the device trigger request based on the subscriber information response.

21. The at least one non-transitory computer-readable storage medium of claim 20, comprising instructions that, in response to being executed at the MTC-IWF node, cause the MTC-IWF node to determine to accept the device trigger request based at least in part on a determination that the subscriber information response indicates that the SCS is authorized to request triggering of the UE.

22. The at least one non-transitory computer-readable storage medium of claim 20, comprising instructions that, in response to being executed at the MTC-IWF node, cause the MTC-IWF node to apply an MTC-IWF load control mechanism in response to receipt of the device trigger request.

23. The at least one non-transitory computer-readable storage medium of claim 22, comprising instructions that, in response to being executed at the MTC-IWF node, cause the MTC-IWF node to determine to reject the device trigger request in response to a determination that an overload condition exists at the MTC-IWF node.

24. The at least one non-transitory computer-readable storage medium of claim 20, comprising instructions that, in response to being executed at the MTC-IWF node, cause the MTC-IWF node to initiate a device trigger delivery procedure to trigger the UE in response to a determination to accept the device trigger request.

25. The at least one non-transitory computer-readable storage medium of claim 24, comprising instructions that, in response to being executed at the MTC-IWF node, cause the MTC-IWF node to send a device trigger report comprising a cause value to indicate an outcome of the device trigger delivery procedure.

* * * * *